(12) United States Patent
Ivarsson et al.

(10) Patent No.: US 11,578,637 B2
(45) Date of Patent: Feb. 14, 2023

(54) EXHAUST GAS TREATMENT DEVICE, A MARINE VESSEL AND A GENSET

(71) Applicant: VOLVO PENTA CORPORATION, Gothenburg (SE)

(72) Inventors: Johan Ivarsson, Gothenburg (SE); Thomas Magnusson, Kungälv (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 0 days.

(21) Appl. No.: 17/647,413

(22) Filed: Jan. 7, 2022

(65) Prior Publication Data

US 2022/0220879 A1 Jul. 14, 2022

(30) Foreign Application Priority Data

Jan. 11, 2021 (EP) .................................. 21150970

(51) Int. Cl.
*F01N 13/00* (2010.01)
*F01N 3/021* (2006.01)
(Continued)

(52) U.S. Cl.
CPC ........... *F01N 13/004* (2013.01); *F01N 3/021* (2013.01); *F01N 3/103* (2013.01); *F01N 3/2066* (2013.01);
(Continued)

(58) Field of Classification Search
CPC ........ F01N 3/24; F01N 13/08; F01N 2450/24; F01N 2590/02; F01N 2590/08;
(Continued)

(56) References Cited

U.S. PATENT DOCUMENTS 1,525,647 A * 2/1925 Haughey ................ F16L 23/032
403/336
4,484,771 A * 11/1984 Schulz ................ F16L 23/0283
285/368
(Continued)

FOREIGN PATENT DOCUMENTS

CN 210271765 U 4/2020
DE 102015115220 A1 4/2016
(Continued)

OTHER PUBLICATIONS

English translation of French Patent Application Publication No. FR 2851293 A1 (2004) (Year: 2004).*
(Continued)

*Primary Examiner* — Matthew T Largi
(74) *Attorney, Agent, or Firm* — Venable LLP; Jeffri A. Kaminski (57) ABSTRACT

An exhaust gas after-treatment device in a driveline application, which device comprising a casing having an upper surface, a lower surface and side surfaces connecting the upper and lower surfaces to form an enclosed volume. The casing is provided with an exhaust inlet opening and an exhaust outlet opening wherein exhaust gas is supplied to and discharged from the casing through the upper surface. At least one of the exhaust inlet and outlet openings is operatively connected to its corresponding inlet or outlet pipe by a pipe connector having a first opening facing the casing and a second opening facing away from the casing. The at least one pipe connector is arranged to be rotatable about the central axis of its associated inlet or outlet opening in the casing into a predetermined angular position relative to the opening in the casing.

12 Claims, 6 Drawing Sheets

(51) Int. Cl.
*F01N 3/10* (2006.01)
*F01N 3/20* (2006.01)
*F01N 13/08* (2010.01)
*F01N 13/18* (2010.01)

(52) U.S. Cl.
CPC ........... *F01N 13/009* (2014.06); *F01N 13/08* (2013.01); *F01N 13/1805* (2013.01); *F01N 13/1838* (2013.01); *F01N 13/1855* (2013.01); F01N 2340/06 (2013.01); F01N 2450/24 (2013.01); F01N 2470/18 (2013.01); F01N 2470/22 (2013.01); F01N 2570/14 (2013.01); F01N 2590/02 (2013.01); F01N 2590/08 (2013.01)

(58) Field of Classification Search
CPC ............ F01N 2470/18; F01N 2470/22; F01N 13/004; F16L 27/02; F16L 23/00; F16L 27/053
USPC .......................................................... 60/302
See application file for complete search history.

(56) References Cited

U.S. PATENT DOCUMENTS

| | | | |
|---|---|---|---|
| 5,196,655 A | 3/1993 | Woods | |
| 5,716,083 A * | 2/1998 | Carr | F16L 23/032 285/368 |
| 7,401,821 B2 * | 7/2008 | Svetlik | F16L 47/14 285/368 |
| 7,878,300 B2 * | 2/2011 | Sammut | F01N 13/1872 181/251 |
| 8,904,766 B2 * | 12/2014 | Saito | F01N 13/009 60/299 |
| 8,943,813 B2 * | 2/2015 | Kamei | F01N 13/0097 60/311 |
| 9,522,722 B1 | 12/2016 | Brouillette et al. | |
| 10,556,658 B1 | 2/2020 | Frost et al. | |
| 2003/0129891 A1 | 7/2003 | Miura | |
| 2008/0069742 A1 * | 3/2008 | Toy | F01N 3/28 422/177 |
| 2008/0277016 A1 * | 11/2008 | Covers | F01N 13/1811 138/155 |
| 2009/0293467 A1 * | 12/2009 | Boeckenhoff | F01N 13/0097 60/324 |
| 2011/0167808 A1 * | 7/2011 | Kosaka | F01N 3/08 60/272 |
| 2012/0141312 A1 | 6/2012 | Lee et al. | |
| 2013/0239940 A1 | 9/2013 | Petersson et al. | |
| 2017/0122174 A1 | 5/2017 | Patel et al. | |
| 2017/0218822 A1 * | 8/2017 | Yamashita | F01N 13/18 |
| 2019/0292946 A1 * | 9/2019 | Karram | F16L 23/032 |
| 2022/0290602 A1 * | 9/2022 | Ratts | F01N 13/017 |

FOREIGN PATENT DOCUMENTS

| | | |
|---|---|---|
| EP | 1596044 A1 | 11/2005 |
| EP | 2915967 A1 | 9/2015 |
| FR | 2851293 A1 | 8/2004 |

OTHER PUBLICATIONS

European Search Report dated Jun. 7, 2021 in corresponding European Patent Application No. 21150970.8, 8 pages.

* cited by examiner

EXHAUST GAS TREATMENT DEVICE, A MARINE VESSEL AND A GENSET

TECHNICAL FIELD

The present invention relates to an exhaust gas treatment device and a marine vessel or a genset provided with such a device.

BACKGROUND

In marine applications, vessels comprising a propulsion unit in the form of a stern drive or an azimuthing pod drive are usually provided with an inboard internal combustion engine (ICE) arranged within the hull of the vessel. Such an ICE is usually connected to an exhaust after treatment system (EATS) arranged in an exhaust system between the ICE and an external outlet exiting through the hull or a submerged propulsion means. The EATS comprises an exhaust gas treatment device having a casing with an inlet opening for receiving exhaust gases and an outlet opening for the exhaust gases. The purpose of the exhaust gas treatment device is to act as a muffler and to perform at least a partial removal of particles and pollutants from the exhaust. Mounting the exhaust gas treatment device requires fitting a first set of pipes upstream of the device to an exhaust manifold on the ICE, as well as a second set of pipes downstream of the device to the external outlet.

In marine installations, a customer can specify the make, type and model of ICE to be installed in the vessel. In addition, a customer may also decide on the final installation of an EATS exhaust gas treatment device on site during installation of the propulsion system. Hence, at the time of ordering the installation, the customer may not know the final layout of the driveline and the EATS installation in the engine compartment. This creates a problem with respect to the exhaust gas treatment device, as there is a plethora of different devices available which all have different inlet and outlet arrangements. Similar installation problems also occur for gensets, where an ICE is used for driving a generator. A genset can be stationary but can also be placed on-board a vessel to generate electrical power for driving propulsion units and other electrical applications.

A solution to this problem is to provide a generic device with multiple alternative openings for exhaust inlet and/or outlet. For instance, three alternative exhaust outlet openings can be provided wherein the customer chooses which outlet to use during installation of the propulsion system. A plug or blanking plate is subsequently placed over the outlets that are not used. A problem with this system is that the provision of several exhaust outlets entails unnecessary packing volume, weight and cost. The solution also limits the possible alternatives to two or three different outlet directions.

The invention provides an improved exhaust gas treatment device aiming to solve the above-mentioned problems.

SUMMARY

An object of the invention is to provide an exhaust gas treatment device for a vessel or a genset, which exhaust gas treatment device solves the above-mentioned problems.

The object is achieved by an exhaust gas treatment device and a marine vessel comprising such an exhaust gas treatment device according to the appended claims.

In the subsequent text, the term "exhaust gas treatment device" is defined as a device comprising a complete EATS for an ICE or comprising only the muffler section of an EATS having gas treatment means upstream (or downstream) of the muffler. The exhaust gas after-treatment device is suitable for use in a marine driveline application, as well as in a marine or stationary genset application. Relative terms such as "upper", "lower" or "side" are intended to describe portions of the device and its casing when the device is mounted in its operative position in a vessel. Parts of components described below can be defined as having an "inlet" and/or an "outlet". These terms refer to the direction of flow of exhaust gas, wherein a component receives exhaust gas through an inlet and discharges exhaust gas through an outlet. When referring to a rotatable component in the subsequent text, the term "rotatable" is to be interpreted a describing a component that is adjustable into a desired position by rotation about a central axis. Such a rotatable displacement can be performed in fixed steps, as a stepless displacement, or by using a combination of stepwise and stepless displacement.

According to a first aspect of the invention, the invention relates to an exhaust gas treatment device comprising a casing having an upper surface, a lower surface and side surfaces connecting the upper and lower surfaces to form an enclosed volume. The casing is provided with an exhaust inlet opening operatively connected to an inlet pipe from a combustion engine; and an exhaust outlet opening operatively connected to an outlet pipe leading to an external outlet. The external outlet can be arranged in a marine drive, a vessel hull or comprise an exhaust pipe leading to the atmosphere, depending on the application for which the device is used. The exhaust gas is supplied to and discharged from the casing through the upper surface. The definition of the term "upper surface" is a mainly planar top surface of the casing. Additional components, such as a converter can be attached to the upper surface, which will be described in further detail below.

In one example, at least one of the exhaust inlet and outlet openings is operatively connected to its corresponding inlet or outlet pipe by a pipe connector having a first opening facing the upper surface of the casing and a second opening facing away from the casing. The term "facing away" indicates that a central axis extending out of the second opening will not intersect the casing at any point. The at least one pipe connector is arranged to be rotatable about the central axis of its associated opening in the casing. As a consequence, the direction of a pipe connector, represented by a plane coinciding with the central axis of the first opening and intersecting the centre of the second opening can be selected. This allows the pipe connector to be located in a predetermined angular position relative to the opening in the upper surface of the casing. Rotation of the pipe connector is performed in order to locate the second opening in a position that coincides with the opening of its associated inlet or outlet pipe during installation of the device.

The first opening of the at least one pipe connector has a central axis coinciding with the central axis of its associated opening in the upper surface in the casing when mounted on the casing. The second opening has a central axis that is separate from the central axis of the first opening, in such a way that it can intersect or be parallel to the central axis of the first opening. However, these axes cannot coincide with each other. Preferably, the central axis of the first opening and the central axis of the second opening are both located in the same plane. This plane coincides with the central axis of the opening in the casing and indicates the direction of a pipe connector, as described above.

According to a further example, both the exhaust inlet and outlet openings are operatively connected to the inlet and outlet pipes, respectively, by individual pipe connectors having a first opening facing the upper surface of the casing and a second opening facing away from the casing. In this example, both pipe connectors are arranged to be rotatable about the central axis of its associated opening in the casing as described above.

The shape of the pipe connector between its first and second openings can be varied freely within the scope of the claims. In its simplest form the central axis of the first opening and the central axis of the second opening both coincide with the same plane wherein the central axis of the second opening is aimed at right angles the central axis of the first opening, or upwards to form an obtuse angle. In this way, the central axis extending out of the second opening can be parallel with but will not intersect a plane coinciding with the upper surface of the casing. The angle between these axes is preferably, but not necessarily, selected from and including 90° and up to 135°, providing a pipe connector having a general L-shape or an obtuse V-shape. As indicated above, these axes may not coincide. Angles above 135° are of course possible, but the effect of rotating the pipe connector will be reduced with increasing angles.

An alternative to this example is to provide a curved or downwardly bent section between the first and second openings of the pipe connector, wherein both axes would still coincide with the same plane but where the central axis extending out of the second opening will intersect a plane coinciding with the upper surface of the casing outside the outer perimeter of the casing. The angle between these axes is preferably, but not necessarily, selected from, but not including, 90° and up to 180°, providing a pipe connector having an acute V-shape or a general U-shape. An advantage with this arrangement is that the second opening of the pipe connector can be aimed downwards relative to the upper surface of the casing in order to face an inlet or outlet pipe extending upwards.

The attachment of a pipe connector to the upper surface of the casing can be achieved in a number of ways. According to one example, the at least one rotatable inlet or outlet pipe connector comprises a radial flange around its first opening, which flange is operatively connectable to a facing radial flange around the corresponding inlet or outlet opening in the upper surface of the casing.

In one example, the pipe connector flange and the casing opening flange have the same bolt circle diameter and identical circular pitch between the bolt holes. The circular pitch is the circumferential distance between adjacent bolt holes. By providing equidistant holes around the annular flanges an identical and symmetrical bolt pattern is achieved. In order to adjust a pipe connector about the axis of the opening in the upper surface of the casing, it is merely required to remove any fasteners connecting the facing flanges. The pipe connector can then be rotated in steps corresponding to the circular pitch, until the second opening of the pipe connector is located in adesired angular position relative to the opening in the upper surface of the casing, where after the fasteners are reattached. In this context, a non-exclusive list of suitable fasteners includes screws or nut and threaded bolts.

Alternatively, the number of bolt holes in one flange can be an integer multiple number of the number of bolt holes provided in the facing flange. As the circular pitch between the bolt holes on the respective flange is identical and dependent on the number of holes. Doubling the number of bolt holes in one of the flanges will provide a circular pitch that is half that of the facing flange. Consequently, this arrangement will double the number of possible positions into which the pipe connector can be adjusted.

The number of fasteners used for clamping the flanges together is dependent on the size of the flange and the maximum bolt circle diameter. The circular pitch is selected to provide a set number of angular positions for the pipe connector flange about the central axis of the opening in the upper surface of the casing. For instance, by using 12 bolt holes in each flange, the pipe connector can be adjusted in steps of 30°. If allowed by the bolt circle diameter, one flange can have 12 bolt holes and the other have 24 bolt holes, the pipe connector can be adjusted in steps of 15°. These steps can be adjusted by selecting a larger or lower number of bolt holes. A further alternative can be to provide one flange, or the flange with fewer bolt holes, with arcuate slots instead of bolt holes. In this way the pipe connector can be additionally adjusted relative to a facing flange over an angle corresponding to the arc of the slots between bolt end positions, which angle is smaller than the circular pitch used between the bolt holes.

Each flange can be formed as a flat annular flange attached directly onto the upper surface of the casing. Alternatively, an annular flange can be fixed to a cylindrical section attached to the upper surface surrounding an opening in the casing. The height of the cylindrical section should be sufficient for providing a gap allowing the fitting of threaded bolts and nuts or other suitable fastening or clamping means used for attaching a pipe connector to the casing. A sealing gasket can be placed between the facing surfaces of the flanges to provide a gas tight seal.

According to a further example, the attachment of a pipe connector to the upper surface of the casing can be achieved by suitable clamping means. For instance, at least the exhaust outlet opening in the casing and the first opening of the at least one pipe connector can comprise circumferential flanges with mating flat or profiled surfaces operatively connected by an external clamping device engaging with outer surfaces of the circumferential flanges.

The circumferential flanges can comprise mating flat surfaces similar to the radial flanges described above. In this case, an external clamping device comprising a pair of annular sections having an enlarged diameter in excess of the diameter of the facing flanges. Each annular section is arranged to engage with the opposing outer surfaces of the flanges to be connected. At least one of the annular sections can be split into at least two sub-sections to allow it to be fitted over an adjacent flange. The annular sections are connected by suitable fasteners, such as threaded nuts and bolts, extending through holes in the enlarged portions of the annular sections. Tightening the fasteners will produce an axial compressive force clamping the flanges together. A sealing gasket can be placed between the mating surfaces to provide a gas tight seal. Rotational adjustment of a pipe connector relative to the opening in the upper surface of the casing merely requires loosening of the fasteners and a subsequent tightening operation.

Alternatively, the circumferential flanges can comprise mating profiled surfaces having a general cone shape. In this case one flange can comprise a conical front section extending towards and radially outwards in the direction of the facing flange. The facing flange can comprise a conical rear section extending towards and radially outwards in the direction of the first flange. The conical rear conical section is followed by a conical front section extending towards and radially inwards in the direction of the first flange. The facing front sections preferably have the same cone angle. The flange located on the casing must extend a distance away from the opening in the upper surface of the casing. When mounting a pipe connector to an opening in the upper surface of the casing, the conical front sections of the facing flanges are arranged in mating contact. A sealing gasket can be placed between the mating surfaces of the conical front sections to provide a gas tight seal.

The pipe connector is fixed in position by means of a circumferential clamping means enclosing the mating conical sections of both flanges. The external circumferential clamping device can be a clamp ring arranged to fix the at least one pipe connector to the flange on the upper surface of the casing in its predetermined angular position relative to its associated opening in the casing. The clamp ring in this example has a V-shaped cross-section that opens up towards the conical sections of both flanges in order to enclose and contact both conical sections. The clamp ring can have a single gap that is drawn together by a clamping device, such as a threaded fastener acting in the tangential direction of the ring, in order to tighten the ring radially inwards around the mating flanges. Alternatively, the ring can be split and comprise two tangential fasteners or a hinge and a single tangential fastener.

The exhaust gas after-treatment device can comprise an exhaust gas cleaning unit that is detachably mounted to the casing and is insertable partially or completely into the casing via the exhaust inlet opening in the upper surface of the casing. If the ICE is a diesel engine, then the exhaust gas cleaning unit can comprise a catalytic converter comprising a diesel oxidation catalyst (DOC), a diesel particulate filter (DPF) and optionally a selective catalytic reduction device (SCR) or a NOx adsorber. The design of catalytic converter systems is well known in the art and will not be described in further detail here.

According to one example, the exhaust gas cleaning unit is detachably mounted inside the casing adjacent the exhaust inlet opening in the casing at or immediately adjacent to the upper surface of the casing. In this case, the exhaust inlet opening is operatively connected to an inlet pipe connector with its first opening facing the exhaust inlet opening and the exhaust gas cleaning unit located in the casing below the exhaust inlet opening. The exhaust outlet opening is located in the upper surface of the casing and is operatively connected to an outlet pipe connector with its first opening facing the exhaust outlet opening. In this example both pipe connectors can be rotatable relative to the upper surface of the casing.

According to a further example, the exhaust gas cleaning unit is detachably mounted at least partially inside the casing and is insertable in the casing via the inlet opening in the upper surface of the casing. An upper portion of the exhaust gas cleaning unit will then extend above the upper surface of the casing. In this case, the exhaust outlet opening is located in the upper surface of the casing and is operatively connected to a rotatable outlet pipe connector with its first opening facing the exhaust outlet opening. The exhaust gas is supplied from the ICE to an exhaust inlet pipe that is operably connected to the portion of the exhaust gas cleaning unit extending out of the upper surface of the casing. Consequently, the exhaust cleaning unit indirectly connects the inlet pipe to the upper surface of the casing without an intermediate rotatable pipe connector.

According to a further aspect of the invention, the invention relates to a marine vessel with a marine driveline comprising at least one combustion engine to propel the vessel, wherein the vessel is provided with at least one exhaust gas after-treatment device as described above.

According to a further aspect of the invention, the invention relates to a genset comprising at least one combustion engine driving an electric generator, wherein the genset is provided with at least one exhaust gas after-treatment device as described above.

The exhaust gas treatment device according to the invention solves the problem of facilitating the installation of the EATS even if changes to the layout are made late during the installation process. By allowing adjustment of one or both of the exhaust inlet and outlet pipe connectors relative to the casing it is possible to adjust pipe connectors into specific positions and directions. Also, by using exchangeable pipe connectors, the angle between pipe connector inlets and outlets can be adapted to a desired angle in order to match a corresponding pipe or conduit from the ICE or leading towards an external outlet. This contributes to shorter pipe installations upstream and downstream of the device, which reduces packing volume, weight and cost. A further advantage is that the use of devices having multiple alternative openings is avoided, which can further reduce packing volume, weight and cost.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
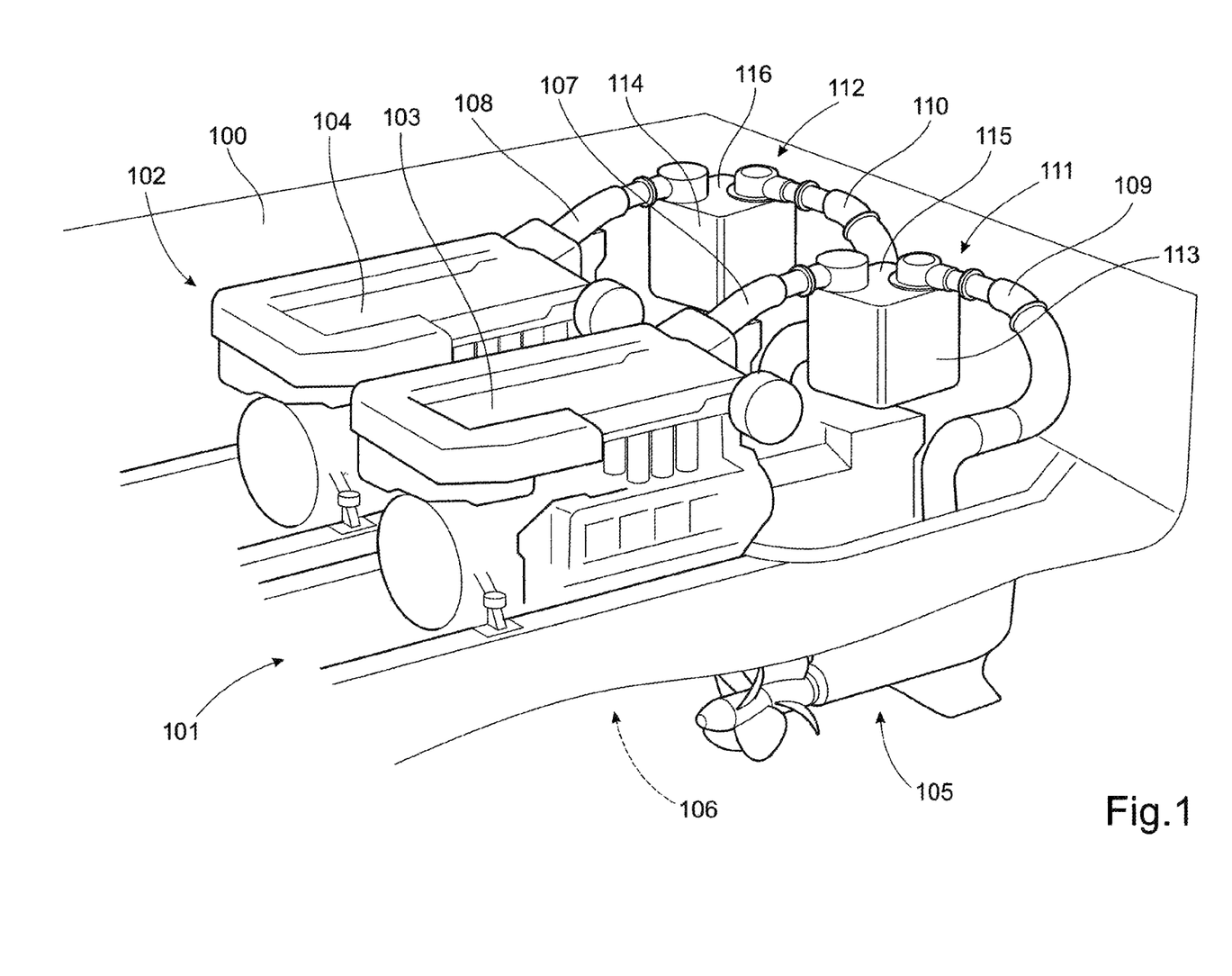
FIG. 1 shows a perspective cut-away view of a schematically illustrated vessel with an exhaust gas treatment device.

FIG. 1 shows a perspective cut-away view of a schematically illustrated marine vessel 100 comprising a double driveline installation 101, 102. Each driveline comprises an internal combustion engine 103, 104 for driving a propulsion unit 105, 106 in the form of an azimuthing pod (one shown). Exhaust gas from each internal combustion engine is passed through a first exhaust conduit 107, 108 to an exhaust gas treatment device 111, 112, and subsequently through a second exhaust conduit 109, 110 to the propulsion unit 105, 106 where it is exhausted into the surrounding body of water. The first exhaust conduits 107, 108 and the second exhaust conduit 109, 110 are connected to an upper surface 115, 116 of a casing 113, 114 of the respective exhaust gas treatment device 111, 112. As schematically indicated in FIG. 1, each casing comprises an upper surface, a lower surface and side surfaces connecting the upper and lower surfaces to form an enclosed volume. In the subsequent text, only one exhaust gas treatment device 111 will be described.

Figure 2:
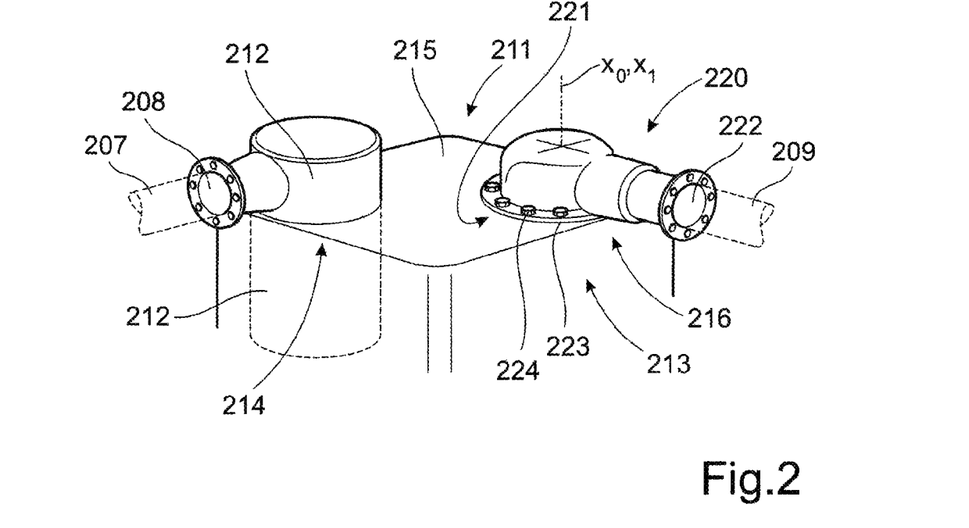
FIG. 2 shows a schematic perspective view of an exhaust gas treatment device according to a first example.

FIG. 2 shows a schematic perspective view of an exhaust gas treatment device 211 according to a first example. The exhaust gas after-treatment device 211 comprises an exhaust gas cleaning unit, or converter 212 that is detachably mounted to a casing 213 and is insertable partially into the casing 213 via an exhaust inlet opening 214 (not shown) in the upper surface 215 of the casing 213. If the ICE is a diesel engine, then the exhaust gas cleaning unit can comprise a catalytic converter comprising a diesel oxidation catalyst (DOC), a diesel particulate filter (DPF) and optionally a selective catalytic reduction device (SCR) or a NOx adsorber. An upper portion 212' of the exhaust gas cleaning unit 212 extends above the upper surface 215 of the casing 213. Exhaust gas is supplied from an ICE (see FIG. 1) to an exhaust inlet pipe 207 (shown in dashed lines) that is operably and detachably connected to an opening 208 in a side surface of the upper portion 212' of the exhaust gas cleaning unit 212 extending out of the upper surface 215 of the casing. The exhaust gas cleaning unit 212 is detachably fixed to the upper surface 215 of the casing 213 but is not rotatable relative to this surface.

Figure 3:
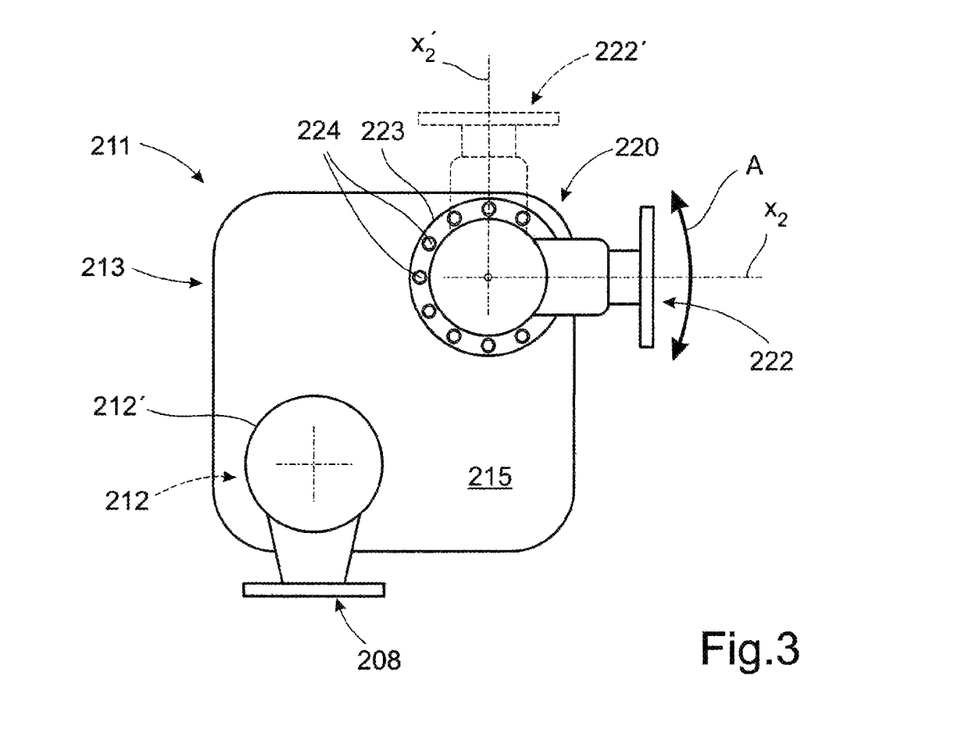
FIG. 3 shows a schematic plan view of the exhaust gas treatment device in FIG. 2.

An exhaust outlet opening 216 (not shown) is located in the upper surface 215 of the casing 213 and is operatively connected to a rotatable outlet pipe connector 220 having a first opening 221 facing the exhaust outlet opening 216. Exhaust gas is expelled from the exhaust gas after-treatment device 211 to an external outlet (see FIG. 1) via an exhaust outlet pipe 209 (shown in dashed lines). The exhaust outlet pipe 209 is operably and detachably connected to a second opening 222 of the rotatable outlet pipe connector 220. The pipe connector 220 is arranged to be rotatable about the central axis $X_0$ of the outlet opening 216 in the casing 213. In this example, the direction of the pipe connector is represented by a plane coinciding with the central axis $X_1$ of the first opening 221 and intersecting the centre of the second opening 222. In FIG. 2, the central axes $X_0$, $X_1$ of the outlet opening 216 and the first opening 221 are arranged to coincide. This allows the pipe connector 220 to be located in a predetermined angular position relative to the opening 216 in the upper surface of the casing 213, as indicated in FIG. 3. The pipe connector 220 is provided with a radial flange 223 around the first opening 221, which flange is in contact with a facing flange (not shown) surrounding the exhaust outlet opening 216 in the upper surface 215 of the casing 213. The facing flanges are connected by a number of threaded fasteners 224, which in this case passes through bolt holes in the radial flange 223 and are screwed into the flange in the casing 213. The pipe connector flange 223 and the casing opening flange have the same bolt circle diameter and identical circular pitch between the bolt holes (see FIG. 8). During installation, the pipe connector 220 can be rotated in steps corresponding to the circular pitch until the second opening 222 is located in a desired angular position where it meets the exhaust outlet pipe 209. The fasteners are then attached and tightened, where after the exhaust outlet pipe 209 can be connected to the second opening 222 by suitable fastening means.

FIG. 3 shows a schematic plan view of the exhaust gas treatment device 211 shown in FIG. 2. FIG. 3 indicates how the pipe connector 220 is rotatable about the coinciding central axes $X_0$ and $X_1$ of the outlet opening 216 (see FIG. 2) in the casing 213 and the first opening 221 of the pipe connector 220. In this example, the direction of the pipe connector coincides with the central axis $X_2$ of the second opening 222. The rotation of the pipe connector 220 is indicated by the arrow A. FIG. 3 also indicates one alternative direction $X_2'$ of the second opening 222' (shown in dashed lines) at 90° from the original position. The number of alternative positions is determined by the circular pitch between fasteners 224 in the flange 223.

Figure 4:
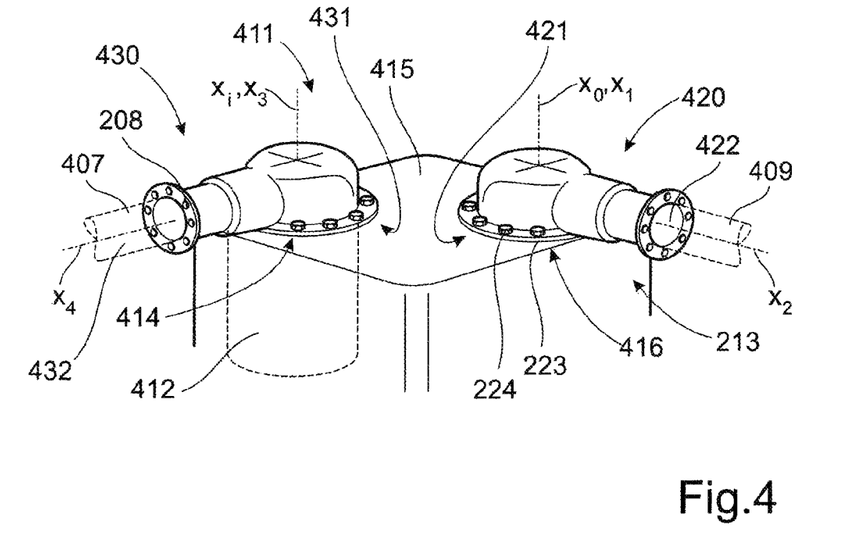
FIG. 4 shows a schematic perspective view of an exhaust gas treatment device according to a second example.

FIG. 4 shows a schematic perspective view of an exhaust gas treatment device 411 according to a second example. The exhaust gas after-treatment device 411 comprises an exhaust gas cleaning unit, or converter 412 that is detachably mounted to a casing 413 and is insertable completely into the casing 413 via an exhaust inlet opening 414 (not shown) in the upper surface 415 of the casing 413. For a diesel engine, the exhaust gas cleaning unit can comprise a catalytic converter comprising a diesel oxidation catalyst (DOC), a diesel particulate filter (DPF) and optionally a selective catalytic reduction device (SCR) or a NOx adsorber.

Exhaust gas is supplied from an ICE (see FIG. 1) from an exhaust inlet pipe 407 (shown in dashed lines) that is operably connected to a rotatable inlet pipe connector 430. The inlet pipe connector 430 has a first opening 431 facing the exhaust inlet opening 414 in the casing 413 and a second opening 432 facing exhaust inlet pipe 407 from the ICE. The exhaust inlet pipe 407 is operably and detachably connected to the second opening 432 of the rotatable inlet pipe connector 430. An exhaust outlet opening 416 (not shown) is located in the upper surface 415 of the casing 413 and is operatively connected to a rotatable outlet pipe connector 420 having a first opening 421 facing the exhaust outlet opening 416 and a second opening 422 facing an exhaust outlet pipe 409 (shown in dashed lines). Exhaust gas is expelled from the exhaust gas after-treatment device 411 to an external outlet (see FIG. 1) via the exhaust outlet pipe 409. The exhaust outlet pipe 409 is operably and detachably connected to the second opening 422 of the rotatable outlet pipe connector 420. In this example the inlet and outlet pipe connectors 420, 430 are both rotatable relative to the upper surface 415 of the casing 413.

Figure 5:
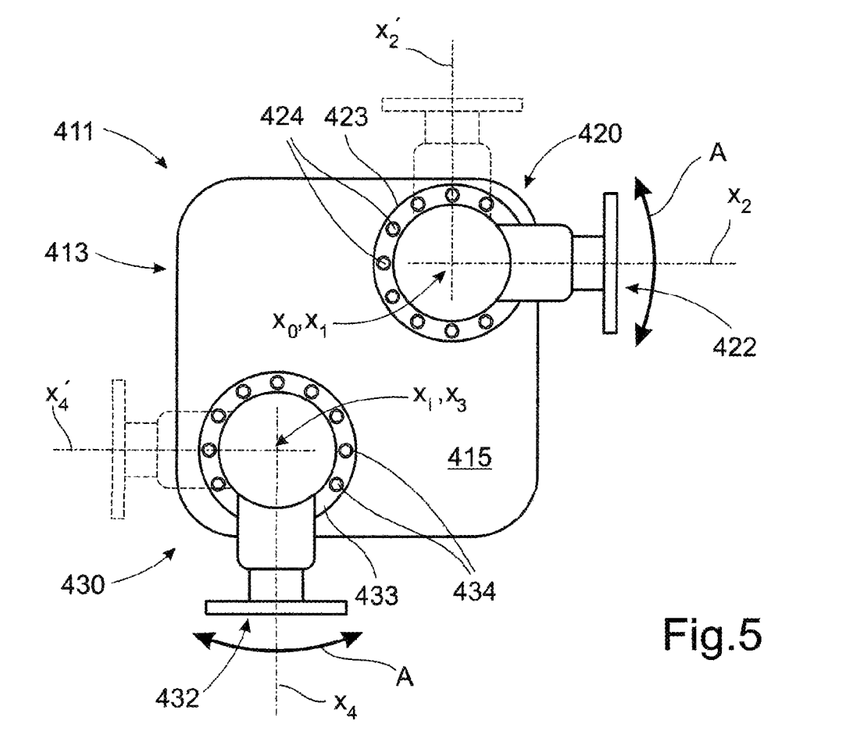
FIG. 5 shows a schematic plan view of the exhaust gas treatment device in FIG. 4.

The inlet pipe connector 430 is arranged to be rotatable about the central axis Xi of the inlet opening 414 in the casing 413. In this example, the direction of the pipe connector is represented by a plane coinciding with the central axis $X_3$ of the first opening 431 and intersecting the centre of the second opening 432. In FIG. 4, the central axes $X_i$, $X_3$ of the inlet opening 414 and the first opening 431 are arranged to coincide. This allows the inlet pipe connector 430 to be located in a predetermined angular position relative to the opening 414 in the upper surface of the casing 413, as indicated in FIG. 5. The inlet pipe connector 430 is provided with a radial flange 433 around the first opening 431, which flange is in contact with a facing flange (not shown) surrounding the exhaust outlet opening 414 in the upper surface 415 of the casing 413. The facing flanges are connected by a number of threaded fasteners 434, which in this case passes through bolt holes in the radial flange 433 and are screwed into the flange in the casing 413. The inlet pipe connector flange 433 and the casing opening flange have the same bolt circle diameter and identical circular pitch between the bolt holes (see FIG. 8). During installation, the inlet pipe connector 430 can be rotated in steps corresponding to the circular pitch until the second opening 432 is located in a desired angular position where it meets the exhaust inlet pipe 407. The fasteners are then attached and tightened, where after the exhaust outlet pipe 407 can be connected to the second opening 432 by suitable fastening means.

The outlet pipe connector 420 is arranged to be rotatable about the central axis Xo of the outlet opening 416 in the casing 413. In this example, the direction of the pipe connector is represented by a plane coinciding with the central axis $X_1$ of the first opening 421 and intersecting the centre of the second opening 422. In FIG. 4, the central axes $X_0$, $X_1$ of the outlet opening 416 and the first opening 421 are arranged to coincide. This allows the pipe connector 420 to be located in a predetermined angular position relative to the opening 416 in the upper surface of the casing 413, as indicated in FIG. 5. The pipe connector 420 is provided with a radial flange 423 around the first opening 421, which flange is in contact with a facing flange (not shown) surrounding the exhaust outlet opening 416 in the upper surface 415 of the casing 413. The facing flanges are connected by a number of threaded fasteners 424, which in this case passes through bolt holes in the radial flange 423 and are screwed into the flange in the casing 413. The pipe connector flange 423 and the casing opening flange have the same bolt circle diameter and identical circular pitch between the bolt holes (see FIG. 8). During installation, the pipe connector 420 can be rotated in steps corresponding to the circular pitch until the second opening 422 is located in a desired angular position where it meets the exhaust outlet pipe 409. The fasteners are then attached and tightened, where after the exhaust outlet pipe 409 can be connected to the second opening 422.

FIG. 5 shows a schematic plan view of the exhaust gas treatment device 411 shown in FIG. 4. FIG. 5 indicates how the inlet pipe connector 430 is rotatable about the coinciding central axes $X_i$ and $X_3$ of the outlet opening 414 (see FIG. 4) in the casing 413 and the first opening 431 of the inlet pipe connector 430. In this example, the direction of the inlet pipe connector coincides with the central axis $X_4$ of the second opening 432. The rotation of the pipe connector 430 is indicated by the arrow $A_1$. FIG. 5 also indicates one alternative direction $X_4'$ of the second opening 432' (shown in dashed lines) at 90° from the original position of the inlet pipe connector 430. FIG. 5 further indicates how the outlet pipe connector 420 is rotatable about the coinciding central axes $X_0$ and $X_1$ of the outlet opening 416 (see FIG. 4) in the casing 413 and the first opening 421 of the outlet pipe connector 420. In this example, the direction of the outlet pipe connector coincides with the central axis $X_2$ of the second opening 422. The rotation of the outlet pipe connector 420 is indicated by the arrow $A_2$. FIG. 5 also indicates one alternative direction $X_2'$ of the second opening 422' (shown in dashed lines) at 90° from the original position. The number of alternative positions for the respective pipe connector 420, 430 is determined by the circular pitch between fasteners 424, 434 in their respective flanges 423, 433.

Figure 6:
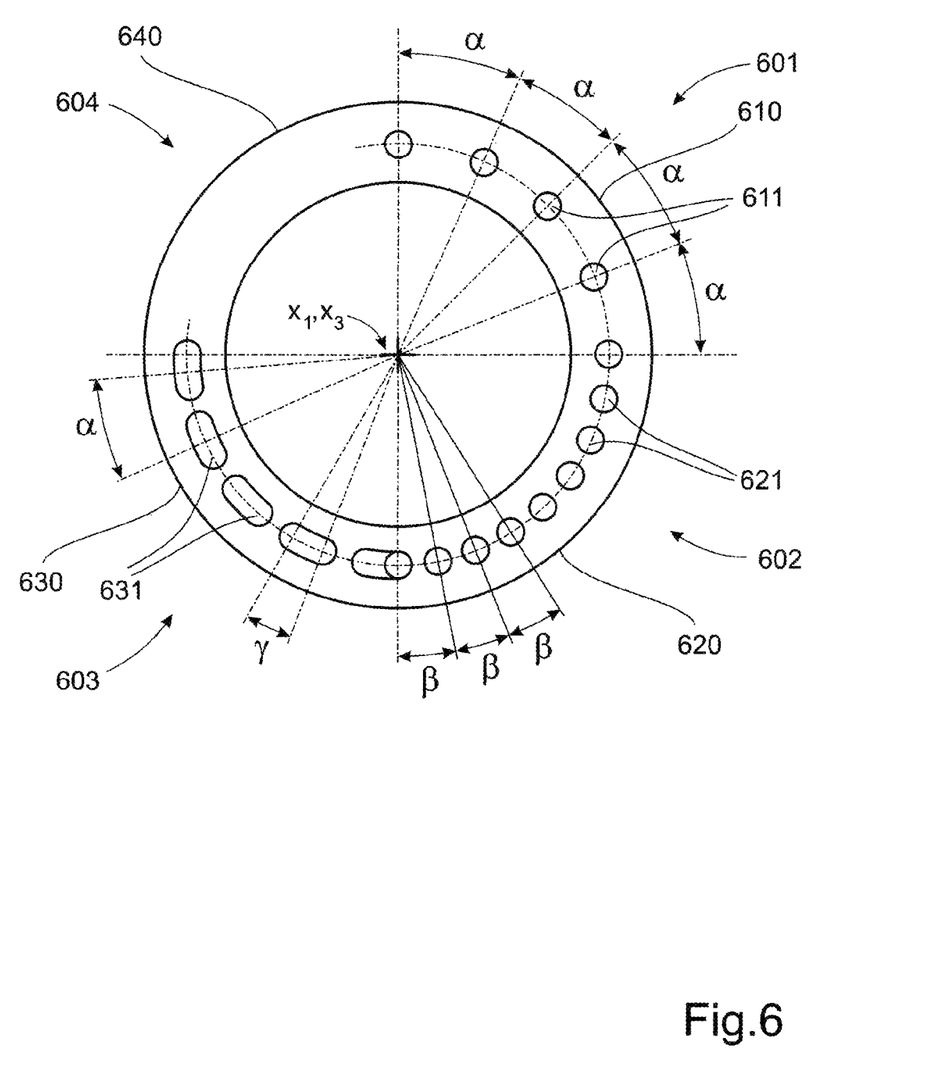
FIG. 6 shows a schematic plan view of alternative examples of flange arrangements.

FIG. 6 shows a schematic plan view of alternative examples of flange arrangements. The attachment of a pipe connector to the upper surface of the casing or to facing flange located above the upper surface of a casing can be achieved in a number of ways. According to one example, a rotatable inlet or outlet pipe connector comprises a radial flange 610 as shown in a first quadrant 601 of FIG. 6. In this example the pipe connector flange 610 and the casing opening flange (not shown) have the same bolt circle diameter D and identical circular pitch α between adjacent bolt holes 611. The circular pitch is the circumferential distance between adjacent bolt holes. By providing equidistant holes 611 around the annular flanges an identical and symmetrical bolt pattern is achieved. In order to adjust a pipe connector about the central axis $X_1$, $X_3$ (see FIGS. 3 & 5) of the opening in the upper surface of the casing, it is merely required to remove any fasteners connecting the facing flanges. The pipe connector can then be rotated in steps corresponding to the circular pitch α, until the second opening of the pipe connector is located in a desired angular position relative to the opening in the upper surface of the casing, where after the fasteners are reattached. The example in quadrant 601 comprises a flange with 16 bolt holes, which allows the pipe connector to be adjusted in steps of 22.5°.

According to a further example, a rotatable inlet or outlet pipe connector comprises a radial flange 620 as shown in a second quadrant 602 of FIG. 6. In this example the pipe connector flange 620 and the casing opening flange (not shown) have the same bolt circle diameter D but different circular pitches. For instance, the casing opening flange can have the same circular pitch a as the flange in quadrant 601, while the pipe connector flange 620 has a reduced circular pitch β between adjacent bolt holes 621. The relationship between the circular pitches requires that the larger circular pitch divided by the smaller circular pitch must yield an integer number. In order to adjust a pipe connector about the central axis $X_1$, $X_3$ (see FIGS. 3 & 5) of the opening in the upper surface of the casing, it is merely required to remove any fasteners connecting the facing flanges. The pipe connector can then be rotated in steps corresponding to the circular pitch β, until the second opening of the pipe connector is located in a desired angular position relative to the flange around the opening in the upper surface of the casing, which flange has 16 holes, where after the fasteners are reattached. The example in quadrant 602 comprises a flange with 32 bolt holes, which allows the pipe connector to be adjusted in steps of 11.25°.

According to a further example, a rotatable inlet or outlet pipe connector comprises a radial flange 630 as shown in a third quadrant 603 of FIG. 6. In this example the pipe connector flange 630 and the casing opening flange (not shown) have the same bolt circle diameter D and an identical basic circular pitch α between adjacent 631 bolt holes. The casing opening flange can be provided with circular holes, while the pipe connector flange 630 is provided with elongated, arcuate bolt holes. In this case the basic circular pitch is the circumferential distance between mid-points of adjacent arcuate bolt holes 631. By providing equidistant arcuate holes 631 around the annular flanges an identical and symmetrical bolt pattern is achieved. In order to adjust a pipe connector about the central axis $X_1$, $X_3$ (see FIGS. 3 & 5) of the opening in the upper surface of the casing, it is merely required to remove any fasteners connecting the facing flanges. The pipe connector can initially be rotated in steps corresponding to the circular pitch α, until the second opening of the pipe connector is located in an approximate desired angular position relative to the opening in the upper surface of the casing. The arcuate holes 631 allows an additional, stepless fine adjustment of the pipe connector, where after the fasteners are reattached. The example in quadrant 603 comprises 16 bolt holes, which allows the pipe connector to be adjusted in steps of 22.5° into an initial position. For instance, if the circular pitch of each arcuate slot is selected to allow a total displacement over an angle γ of 10° between bolt end positions, then the pipe connector can be adjusted a further 5° to either side of the initial position halfway between the end positions.

According to a further example, a rotatable inlet or outlet pipe connector comprises a solid radial flange 640 as shown in a fourth quadrant 604 of FIG. 6. Each flange can be formed as a flat annular flange 640 fixed to a cylindrical section (not shown) attached to the upper surface surrounding an opening in the casing. The height of the cylindrical section should be sufficient for providing a gap allowing the fitting suitable fastening or clamping means around opposing surfaces of the cooperating flanges for attaching a pipe connector to the casing (see FIG. 9C).

Figure 7:
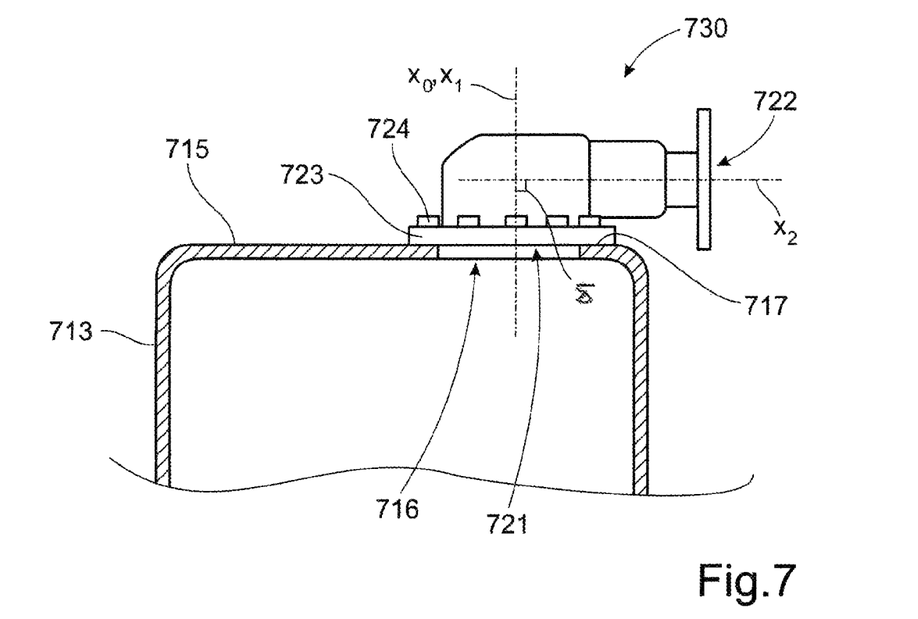
FIG. 7 shows a side view of a pipe connector according to a first example.

FIG. 7 shows a side view of a pipe connector according to a first example. In this example the central axis $X_0$ of an opening 716 in the upper surface 715 of a casing 713 coincides with the central axis $X_1$ of a first opening 721 in a pipe connector 730. The central axis $X_2$ of a second opening 722 in the pipe connector 730 intersects the central axis $X_1$ of the first opening 721 at right angles, as indicated by the angle δ, wherein both axes coincide with vertical plane. A radial flange 717 surrounds the opening 716 in the upper surface 715 and cooperates with a radial flange 723 surrounding the first opening 721 of the pipe connector 730.

Figure 8:
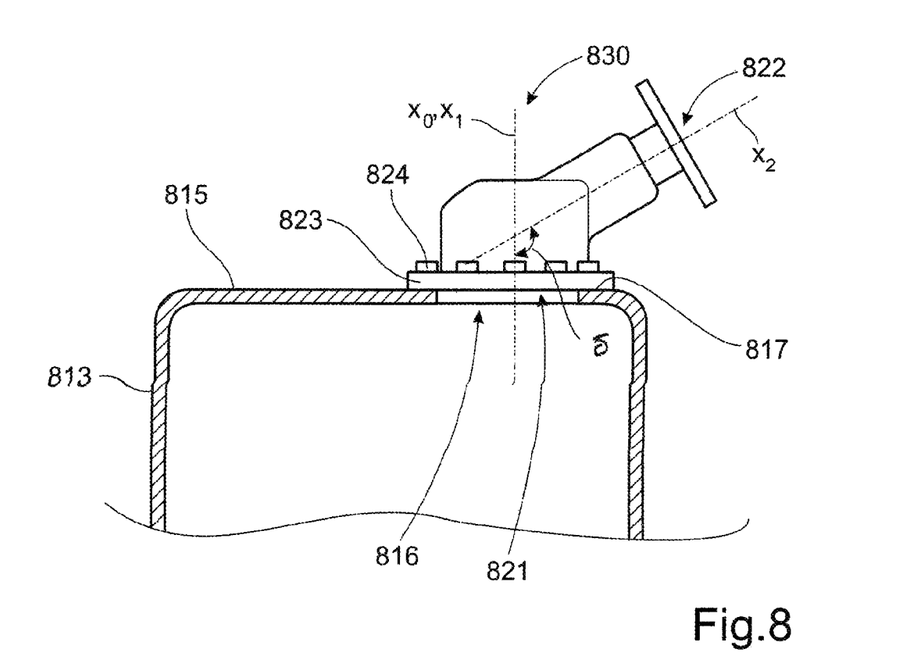
FIG. 8 shows a side view of a pipe connector according to a second example.

FIG. 8 shows a side view of a pipe connector according to a second example. In this example the central axis $X_0$ of an opening 816 in the upper surface 815 of a casing 813 coincides with the central axis $X_1$ of a first opening 821 in a pipe connector 830. The central axis $X_2$ of a second opening 822 in the pipe connector 830 intersects the central axis $X_1$ of the first opening 821 at an obtuse angle δ, in this case 135°, wherein both axes coincide with vertical plane. The angle δ between these axes is preferably, but not necessarily, selected between 90° and 135°, providing a pipe connector having a general L-shape or an obtuse V-shape. The axes $X_1$ and $X_2$ may not coincide. Angles above 135° are possible, but the useful effect of rotating the pipe connector will be reduced with increasing angles. A radial flange 817 surrounds the opening 816 in the upper surface 815 and cooperates with a radial flange 823 surrounding the first opening 821 of the pipe connector 830.

Figure 9A:
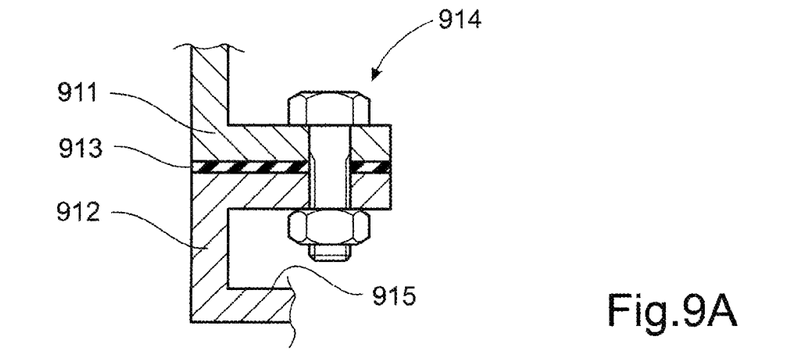
FIG. 9A-C show schematic cross-sectional views of alternative examples of clamping arrangements for pipe connector.
Figure 9B:
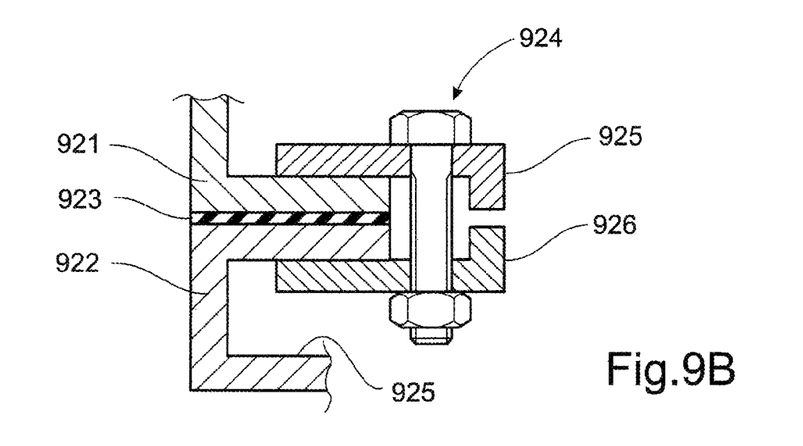
Figure 9C:
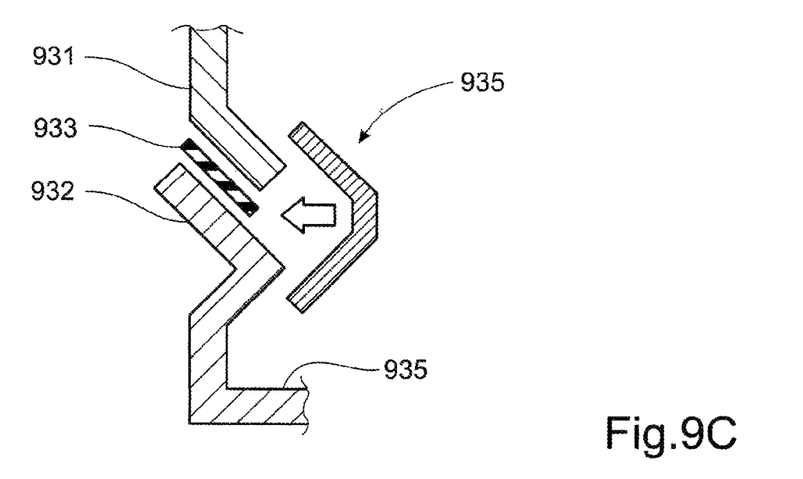

FIGS. 9A-9C show schematic cross-sectional views of alternative examples of clamping arrangements for pipe connector. The attachment of a pipe connector to the upper surface 915 of a casing can be achieved by suitable clamping means. FIG. 9A shows a first example where a pair of facing circumferential flanges 911, 912 comprise mating flat surfaces, wherein the flanges are provided with a number of holes placed on the same bolt circle diameter and with the same circular pitch. The flanges 911, 912 are clamped together by suitable fasteners 914, such as threaded nuts and bolts, extending through the holes in the flanges 911, 912. Tightening the fasteners 914 will produce an axial compressive force clamping the flanges together. A sealing gasket 913 is placed between the mating surfaces to provide a gas tight seal. Rotational adjustment of a pipe connector relative to the opening in the upper surface of the casing is performed by loosening and removal of the fasteners, making an adjustment and reassembling of the fasteners.

FIG. 9B shows a further example where a pair of facing circumferential flanges 921, 922 comprise mating flat surfaces similar to the radial flanges described above. In this case, an external clamping device comprising a pair of annular sections 925, 926 having an enlarged diameter in excess of the diameter of the facing flanges 921, 922. Each annular section is arranged to engage with the opposing outer surfaces of the flanges to be connected. At least one of the annular sections can be split into at least two subsections to allow it to be fitted over an adjacent flange. The annular sections are clamped together by suitable fasteners 924, such as threaded nuts and bolts, extending through holes in the enlarged portions of the annular sections 925, 926. Tightening the fasteners 924 will produce an axial compressive force clamping the flanges together. A sealing gasket 923 is placed between the mating surfaces to provide a gas tight seal. Rotational adjustment of a pipe connector relative to the opening in the upper surface of the casing merely requires loosening of the fasteners, performing an adjustment and a subsequent tightening operation.

FIG. 9C shows a further example where a pair of circumferential flanges 931, 932 comprise mating profiled surfaces having a general cone shape. In this case one flange 931 comprises a conical front section extending towards and radially outwards in the direction of the facing flange. The facing flange 932 comprises a conical rear section extending towards and radially outwards in the direction of the first flange 931. The conical rear conical section is followed by a conical front section extending towards and radially inwards in the direction of the first flange 931. The facing front sections preferably have the same cone angle. The flange 932 located on the casing must extend a distance away from the opening in the upper surface 915 of the casing. When mounting a pipe connector to an opening in the upper surface 915 of the casing, the conical front sections of the facing flanges are arranged in mating contact. A sealing gasket 933 is placed between the mating surfaces of the conical front sections to provide a gas tight seal.

The pipe connector is fixed in position by means of a circumferential clamping means 935 enclosing the mating conical sections of both flanges 931, 932. The external circumferential clamping means 935 can be a clamp ring arranged to fix the pipe connector to the flange 932 on the upper surface of the casing in its predetermined angular position relative to its associated opening in the casing, as described above. The clamp ring in this example has a V-shaped cross-section that opens up towards the conical sections of both flanges in order to enclose and contact both conical sections. The clamp ring can have a single gap that is drawn together by a clamping device, such as a threaded fastener acting in the tangential direction of the ring, in order to tighten the ring radially inwards around the mating flanges. Alternatively, the ring can be split and comprise two tangential fasteners or a hinge and a single tangential fastener.

It is to be understood that the present invention is not limited to the embodiments described above and illustrated in the drawings; rather, the skilled person will recognize that many changes and modifications may be made within the scope of the appended claims.

The invention claimed is:

1. An exhaust gas after-treatment device in a driveline application, the device comprising a casing having an upper surface, a lower surface and side surfaces connecting the upper and lower surfaces to form an enclosed volume, which casing is provided with an exhaust inlet opening operatively connected to an inlet pipe from a combustion engine and an exhaust outlet opening operatively connected to an outlet pipe leading to an external outlet; wherein: at least one of the exhaust inlet and outlet openings is operatively connected to its corresponding inlet or outlet pipe by a pipe connector having a first opening facing the casing and a second opening facing away from the casing; the at least one pipe connector is arranged to be rotatable about the central axis of its associated inlet or outlet opening in the casing into a predetermined angular position relative to the opening in the casing, in order to locate the direction of the second opening in the predetermined angular position; at least the exhaust outlet opening and the first opening of the at least one pipe connector has circumferential flanges with mating surfaces operatively connected by an external clamping device engaging with the circumferential flanges; the external clamping device comprises a pair of annular sections having an enlarged diameter in excess of the diameter of the flanges, wherein each annular section is arranged to engage with opposing outer surfaces of the flanges to be connected; a seal arranged between the mating surfaces to provide a gas tight seal; and wherein the annular sections are clamped together by fasteners extending through bolt holes in the enlarged diameter portions of the annular sections.

2. The exhaust gas after-treatment device according to claim 1, wherein the first opening of the at least one pipe connector has a central axis coinciding with the central axis of its associated opening in the casing and the second opening has a central axis that is angled into the predetermined angular position relative to the opening in the casing.

3. The exhaust gas after-treatment device according to claim 1, wherein both the exhaust inlet and outlet openings are operatively connected to the inlet and outlet pipes, respectively, by individual pipe connectors having the first opening facing the casing and the second opening facing away from the casing.

4. The exhaust gas after-treatment device according to claim 1, wherein the pipe connector flange and the exhaust opening flange have a same bolt circle diameter and identical circular pitch between the bolt holes.

5. The exhaust gas after-treatment device according to claim 4, wherein the circular pitch is selected to provide a set number of angular positions for the pipe connector flange.

6. The exhaust gas after-treatment device according to claim 1, wherein the number of bolt holes in one flange is an integer multiple number of the number of bolt holes in a facing flange.

7. The exhaust gas after-treatment device according to claim 1, wherein the external clamping device is a clamp ring arranged to fix the at least one pipe connector in its predetermined angular position relative to its associated opening in the casing.

8. The exhaust gas after-treatment device according to claim 1, wherein the device comprises an exhaust gas cleaning unit that is detachably mounted to the casing and is insertable into the casing via the exhaust inlet opening.

9. The exhaust gas after-treatment device according to claim 8, wherein the exhaust inlet opening is operatively connected to a pipe connector with its first opening facing the exhaust gas cleaning unit in the casing.

10. The exhaust gas after-treatment device according to claim 8, wherein the exhaust inlet pipe is operably connected to a portion of the exhaust gas cleaning unit extending out of the casing.

11. A marine vessel with a marine driveline comprising at least one combustion engine to propel the vessel, wherein the vessel is provided with at least one exhaust gas after-treatment device according to claim 1.

12. A genset comprising at least one combustion engine driving an electric generator, wherein the genset is provided with at least one exhaust gas after-treatment device according to claim 1.

* * * * *